Nov. 17, 1964 SHIRO OKAMURA 3,157,739

SIGNAL RECORDING AND REPRODUCING SYSTEM

Filed Nov. 27, 1962 4 Sheets-Sheet 1

INVENTOR.
SHIRO OKAMURA

BY Hopgood & Calimafde

ATTORNEYS.

INVENTOR.
SHIRO OKAMURA
BY
Hopgood & Calimafde
ATTORNEYS.

INVENTOR.
SHIRO OKAMURA

BY Hopgood & Calimafde

ATTORNEYS.

INVENTOR.
SHIRO OKAMURA
BY Hopgood & Calimafde
ATTORNEYS.

3,157,739
SIGNAL RECORDING AND REPRODUCING SYSTEM

Shiro Okamura, 26 2-chome, Shiroganedaimachi, Shiba, Minatoku, Tokyo, Japan

Filed Nov. 27, 1962, Ser. No. 240,258
13 Claims. (Cl. 178—6.6)

This invention relates to a recording and reproducing system, and particularly to a tape recorder for use in video systems.

In video tape recorders of the prior art, recorded tracks are formed on magnetic tape parallel and adjacent one another obliquely or traversely of the length of the tape by means of a rotating magnetic head assembly. For best reproduction, the reproducing head must follow the recorded track as precisely as possible and accordingly a servo tracking system is employed to control the rotation of the motor capstan to enable correct tracking, this control being effected by comparing the signal from a control track recorded on the tape with a reference signal timed with the movement of the rotating head. Such known recording systems employing a tracking servo arrangement require a great deal of electronic circuitry and apparatus which is bulky and expensive.

Accordingly, it is an object of this invention to provide a video tape recorder which is compact and inexpensive, by eliminating the servo tracking arrangement referred to above.

Another object of this invention is to provide a video tape recorder of the type described which can be employed to produce smooth, quick, still or slow motion effects of a television picture.

These and other objects, features and advantages will be best understood from a reading of the following specification in conjunction with the accompanying drawings, in which.

Figure 1:
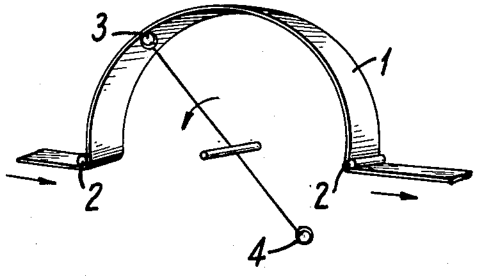
FIG. 1 is a schematic representation of a video tape recorder employed with the present invention.
Figure 3A:
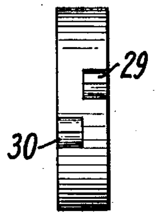
Figure 3B:
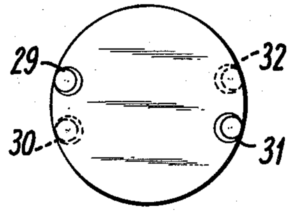
Figure 4A:
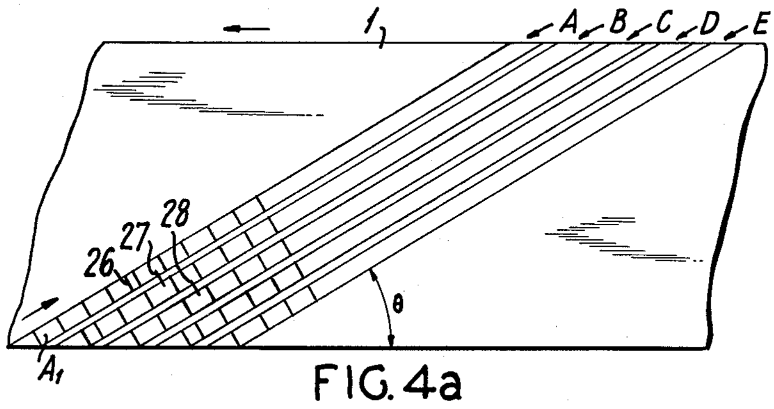
Figure 4B:
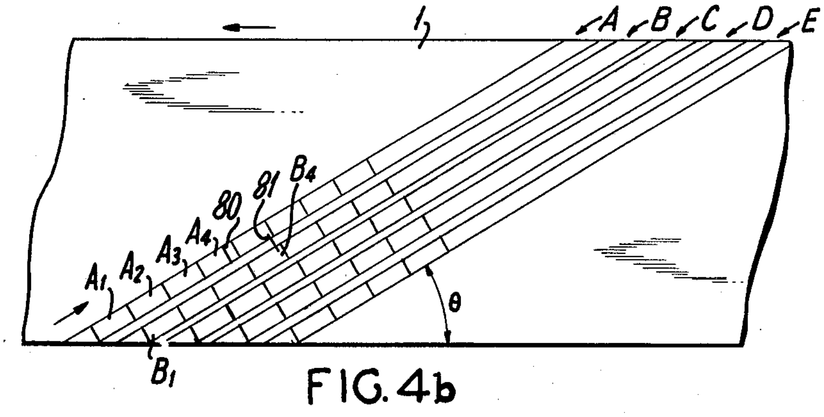
Figure 5:
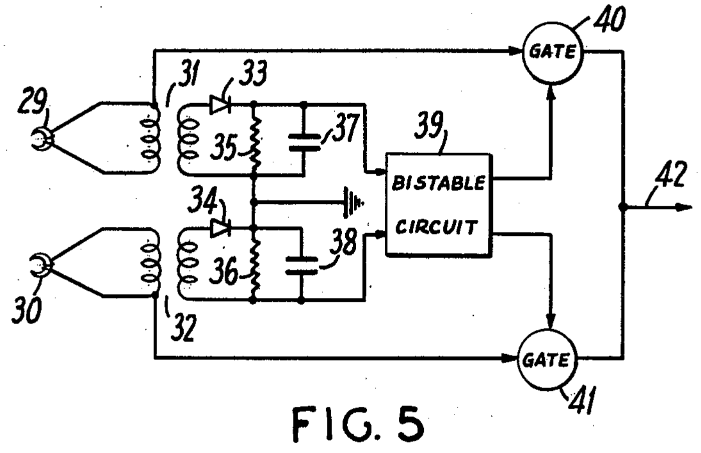

FIGS. 3*a* and 3*b* show an example of a rotating head assembly employed as part of the apparatus of FIG. 1, FIGS. 4*a* and 4*b* illustrate alternative recorded pattern arrangements and the positions of magnetic heads at various stages in the reproduction of these patterns, FIG. 5 shows a combination block and schematic wiring diagram of head switching apparatus according to the invention.

Figure 6:
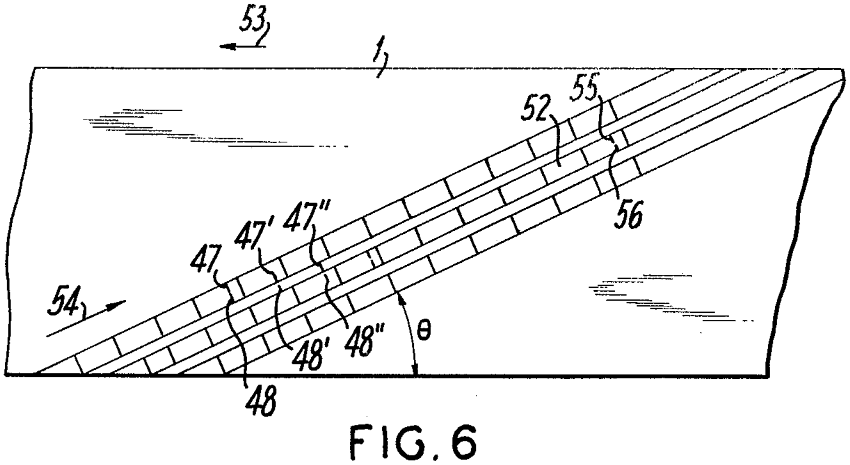
Figure 7A:
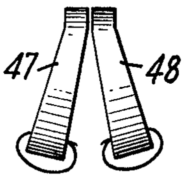
Figure 7B:
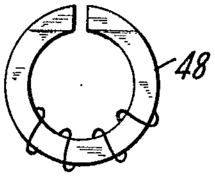

FIG. 6 shows still another example of a recorded pattern and head position arrangement in accordance with the invention, FIGS. 7*a* and 7*b* show a double head arrangement utilized in the system shown in FIG. 6.

Figure 8:
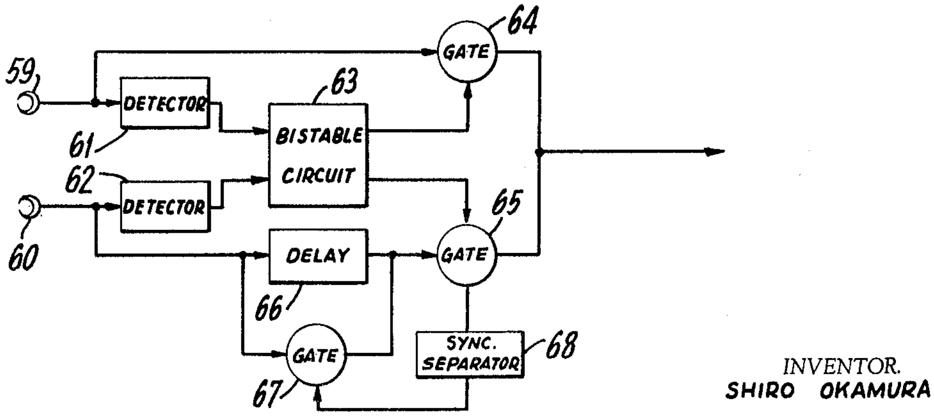

FIG. 8 shows a further head switching arrangement in block form in accordance with the invention.

Figure 9:
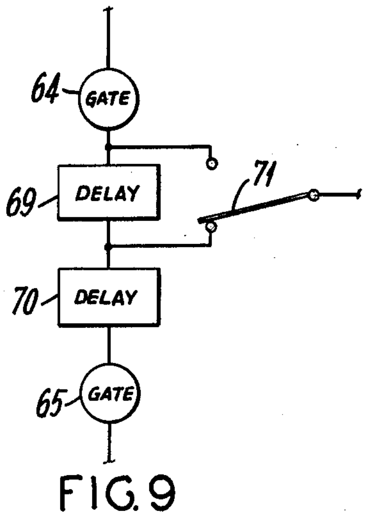
Figure 10:
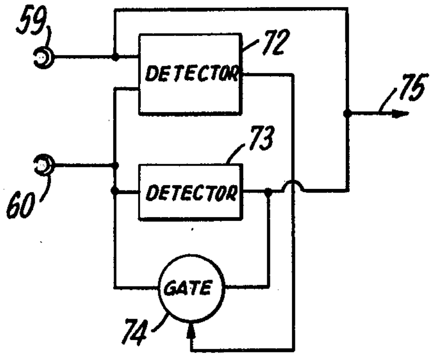

FIG. 9 shows a modification of a part of the system shown in FIG. 8,

FIG. 10 shows a further modification of the system shown in FIG. 8, and

Figure 11:
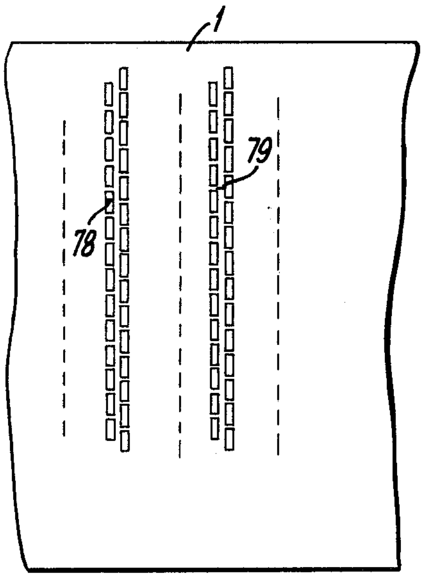

FIG. 11 shows a still further recorded track pattern and head position arrangement in accordance with the invention.

According to the present invention there is provided a system for recording periodic signals which includes means for recording the signals in substantially parallel tracks on a recording medium. On playback, means are provided for scanning the recorded tracks with a plural number of reproducing heads which are disposed in a substantially complementary manner, and means are further provided for automatically switching or for adding the output signals from said reproducing heads in order to provide high quality reproduction with a minimum of apparatus and expense.

Figure 2:
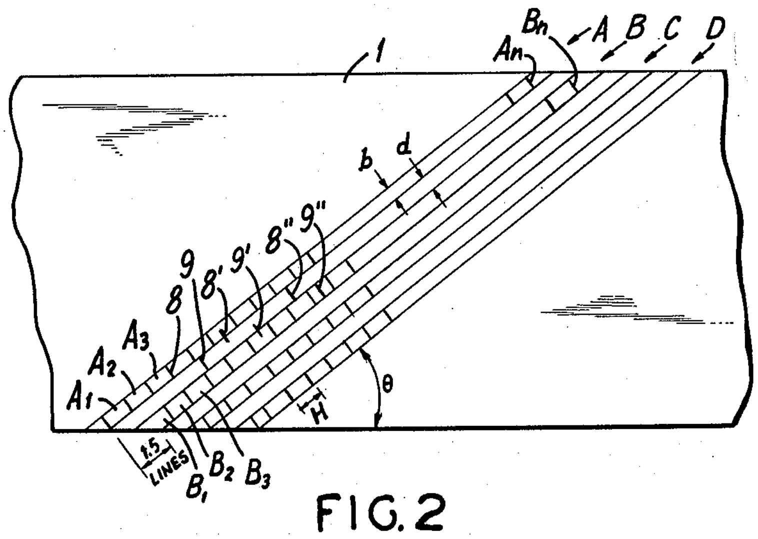
FIG. 2 shows one example of a recorded pattern developed by the apparatus of FIG. 1.

Referring now to FIG. 1 there is shown a schematic representation of a two head video tape recorder. A strip of magnetic tape 1 is arranged to be helically advanced over tape guides 2 and around a 180° surface of a cylinder (not shown). Two composite rotating heads 3 and 4 moving preferably opposite to the general direction of movement of the tape 1 scan the inner surface of the tape. This produces a recorded pattern in the form of parallel tracks A, B, C, D, etc., oblique to the direction of length of the tape as shown in FIG. 2. Each track may represent either a field or a frame of a picture as desired. The recorded pattern can be obtained either with a single recording head employed with a tape arranged to traverse approximately 360° of the cylinder or with two heads as shown in FIG. 1 with the tape arranged to traverse approximately 180° of the cylinder surface.

In FIG. 2 the designations A1, A2, A3 . . . $A_n$ and B1, B2, B3 . . . $B_n$, etc. each represent a horizontal line of a video picture field. Accordingly, because of the interlacing when one track represents one field, adjacent tracks must be shifted or displaced by an amount equal to an odd multiple of one half the length or time of a horizontal line. In FIG. 2 this is shown as 1.5 lines and is easily achieved by proper choice of the length of the track and of the angle $\theta$ of the tracks with the longitudinal axis of the tape for a given speed of the tape. The line information A2, A3, A4, etc., can be positioned on the tape directly opposite the corresponding line information B1, B2, B3 etc., of the adjacent line. In other words, the horizontal line signal information represented by B2 in the B track for example, may be located on the tape directly opposite the horizontal line signal information represented by A3 in the A track, etc.

Reproduction of the recorded information of FIG. 2 is accomplished by means of a pair of magnetic pickup heads which scan the recorded pattern and which are arranged in complementary relationship. This means that the two heads are spaced so that when one of the heads is tracking perfectly as shown by the numeral 8, that the other head is mistracking perfectly as shown by the numeral 9, indicating that the head is located between two tracks.

If the reproduction of the video signal pattern of FIG. 2 is performed simultaneously by two complementary magnetic heads having positions as shown at 8 and 9, and if the width of the various tracks *b* is equal to the width of the head gap and also equal to the spacing *d* between the tracks, the reproduced signal summed from the two heads will be substantially constant as the heads scan the pattern, such as shown by 8′, 9′ and 8″, 9″. The signals to be added from each head will differ only very slightly from each other because the picture line information does not vary substantially from field to field or from frame to frame. Thus it is seen that it is not necessary for the reproducing heads to track exactly on the recorded pattern as is necessary in the prior art which employs the servo tracking system described above. With the arrangement of FIG. 2, however, some extra amount of tape is required for a given recording time.

FIG. 3 illustrates one form of a head assembly structure for a two head video tape recorder having two composite head assemblies, one composite assembly having two complementary heads 29–30 and the other composite assembly having two complementary heads 31–32. The heads are shown on a cylinder, however, they may be mounted at opposite ends of an arm or in any other suitable means as desired. The composite head assembly 29–30 is represented schematically by the numeral 3 in FIG. 1 and the head assembly 31–32 is represented by the numeral 4. Further, the various positions 8 and 9 in FIG. 2 correspond to the positions of the complementary heads 30 and 29 respectively, or to the positions of the complementary heads 32 and 31, respectively.

FIG. 4*a* illustrates a recorded pattern in which the spacing between tracks is small as in known systems. Accordingly, due to the close spacing of these tracks, the reproducing heads 26 and 27 will, unlike the case with the pattern of FIG. 2, develop signals from more than two tracks. In FIG. 4*a*, the complementary head system comprises the combination of either the heads 26 and 27 or heads 26 and 28. This head system corresponds to the combination of heads 31 and 32 in FIG. 3; thus head 26 corresponds to the head 31 and head 27 or 28 corresponds to the head 32. The distance between the two complementary heads is an odd multiple of one-half the spacing between adjacent tracks. In the case of the combination of heads 26 and 27 this distance is one-half, and for the heads 26 and 28 it is one and one half times the spacing between adjacent tracks. In accordance with the invention, switching provision is made to select the reproducing head having the maximum output to thereby achieve the best quality reproduction. Selection is made by comparing the output signals from the heads 26 and 27 or 26 and 28 on the basis of the output signal amplitude versus noise signal amplitude.

Switching may advantageously be accomplished during the horizontal or vertical blanking periods so as to avoid discontinuity of the signal in the reproduced picture. If switching is performed in this manner, it is then unnecessary to arrange the tracks so that individual line information on one track is positioned exactly opposite the line information on its adjacent tracks as described above, and also unnecessary that the horizontal blanking signals be aligned. Accordingly, see FIG. 4*b*, the reproducing heads 80 and 81 (29 and 30) are positioned in corresponding phase on adjacent tracks. Thus heads 80 and 81 are so positioned with respect to each other as to be in corresponding phase position respectively with the line information segments A4 and B4. However, in this case, instantaneous switching in one direction must be avoided, or should be done during the vertical blanking period so that discontinuity in reproduction of the picture will be avoided.

Discontinuity in the reproduction of the picture will occur, for example, when switching from head 26 to head 27, see FIG. 4*a*, if the tracks progressively shift to the right or downward in FIG. 4*a* with respect to the heads. This would be the situation if the tape were moved more slowly during reproduction than during recording for the directions of scanning and tape translation indicated in FIG. 4*a*. Accordingly, it will be seen that as the tape moves along, the track A will progressively move out of perfect registration with the head 26 and into position of better registration with the head 27. This will cause the output of head 26 to decrease and that of head 27 to increase, resulting in switching from head 26 to head 27 when the output from the head 27 equals or exceeds that of the head 26. As a result of this switching, one horizontal line is skipped out and the picture therefore changes in the vertical direction by this amount. This is known as discontinuity or transient in the reproduced picture. If the tracks shift in the opposite direction with respect to the heads, i.e. to the left or upwardly in FIG. 4*a*, no discontinuity will occur since the switching will be from the head 27 to the head 26.

FIG. 5 shows a novel circuit arrangement for switching heads according to the invention. The two reproducing heads 29, 30, are separately coupled to diode rectifiers 33 and 34, respectively, via coupling transformers 31 and 32, respectively. The rectified signals from the diodes 33, 34 are then coupled respectively to time constant circuits 35–37 and 36–38 and then to a bistable circuit 39. The bistable circuit 39 is triggered from one state to another depending upon the amplitudes of the potentials from the complementary heads 29 and 30. The bistable circuit 39 controls the gates 40 and 41 in such a manner that the reproducing head having the greatest signal amplitude can be selected.

If three complementary heads are used for reproduction, a tristable circuit may be used in lieu of the bistable circuit 39. In the switching condition each head is slightly out of register from the correct tracking position, and therefore the greater the number of reproducing heads employed, the better will be the noise figure due to effective reduction of the tracking deviation of each head.

FIG. 6 shows another form of arrangement for positioning the heads relative to the recorded track system. Accordingly, reproducing heads 47 and 48 comprise two heads, see FIGS. 6 and 7A, having inline gaps, see FIG. 7*b*, each gap having a dimension of about one-half the track width *b*, see FIG. 6. Recording can be achieved by connecting the two heads 47 and 48 together. For reproduction, however, the two heads are separated and switched as described above with respect to FIG. 5. The narrower gap of the heads described with respect to FIGS. 6 and 7 enables more perfect tracking. Further when switching is between two heads within the same track due to the head assembly construction of FIG. 7, it is evident that switching produces no discontinuity. In other words, regardless of the relative speed of the tape during reproduction compared with that of recording, there is no discontinuity when switching in the same track from head 47 to 48, or from head 48 to 47 of FIG. 6.

In the case of FIG. 4, slower tape velocity during reproduction compared with that of recording produces switching from head 26 to 27, and faster velocity produces switching from head 27 to 26. When the velocity of the tape is increased slightly from that of recording, switching of the heads is performed without any deviation of the horizontal line sequence; the reverse switching which would result in discontinuity can be performed during the blanking period to thereby avoid such discontinuity, and vice versa when the tape velocity is slightly lower.

Various means can be employed to decrease the tape velocity below that used for recording. For example, the current of the motor can be decreased slightly. An increase of the friction of the tape against the cylinder may also be employed to reduce the tape speed. Also, varying the friction between the tape and the capstan can be employed. Slight increase of the tape velocity can be effected by employing opposite techniques to those above for reducing the velocity. Variation of the velocity in either direction can also be achieved by a conical pulley or tapered idler roller as is well known.

The velocity of the tape can be monitored to ascertain whether it is higher or lower than the recording speed by means, for example, of a tachometer or other suitable means. The instantaneous switching can then be performed in the direction which is switched without any discontinuity. This is performed by a combination of a bistable circuit and triggered gate circuits as described herein.

In the case of FIG. 6, if there are employed in addition to the heads 55 and 56, another head 52 arranged at a position according to the point of discontinuity of the horizontal line as shown, the instantaneous switching in either direction can be performed without discontinuity by the following procedure. Assume direction of the tape and the direction of scanning as shown by the arrows 53 and 54, respectively. When the tape velocity is slower than that used during recording, the switching from head 56 to head 55 suffers from shift of the line sequence. If the switching is done from head 56 to head 52 instead of head 55, no discontinuity is produced. Then during the blanking period, the switching from head 52 to head 55 can be performed. This cycle is shown as follows:

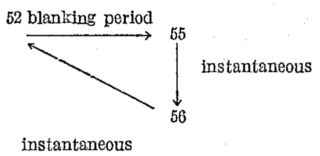

For a tape velocity greater than that used for recording, the cycle of switching would be as follows:

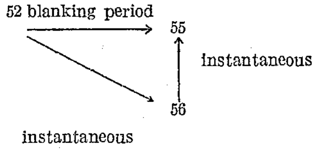

In this way the switching during the picture information or scanning trace period can be performed without waiting until the blanking period. This is preferable for reproduction by quick, still or slow motion, otherwise the picture may have poor resolution. The summation of the output signals of heads 55 and 56 or heads 56 and 52 can also be utilized to produce a resultant output as in the case of FIG. 2. That is, two or three heads which have the same line sequence may be automatically selected. This selection can be controlled so as to select heads 55 and 56 if they are on the same track and to select heads 56 and 52 if heads 55 and 56 lie on different tracks. For instance, for the slower reproduction, if the output of head 56 increases, heads 55 and 56 are combined. And if the output of head 55 increases, heads 55 and 56 are combined. Further means can also be provided to be actuated, depending upon the relative outputs of two heads to provide additional switching as desired.

It is to be noted that the direction of switching resulting in no discontinuity is opposite for the cases of FIGS. 4 and 6.

Means may also be employed to record a pilot signal along the tape edges to thereby enable the reproducing heads either to discriminate whether they are on the same track or on adjacent tracks or to indicate the tracking position of a head. This is performed, for example, by a burst signal which has alternately opposite phases or different frequencies. The burst signal is time gated and detected in its phase by means of known technique. The detected signal is then used to indicate the tracking position of a head and can be utilized to select one of the reproducing heads, to select the switching direction or to effect summation of the output signals of the heads as described above. Also, if desired, one of the reproducing heads can be utilized as a monitor head in order to monitor the picture during the recording period.

Referring now to the block diagram of FIG. 8, the output signals from the reproducing heads 59 and 60 are fed to detectors 61 and 62, respectively. The output signals from these detectors are then fed to a bistable circuit 63 which develops trigger voltages to trigger the gates 64 and 65, respectively. This circuit arrangement is generally similar to that shown in FIG. 5. However, FIG. 8 further includes a delay circuit 66 which eliminates discontinuity when switching from head 59 to head 60. Reverse switching from head 60 to head 59 must also be carried out if continuous mistracking in the same direction is followed. This latter switching should not contain any delay, and therefore the delay circuit 66 should be short circuited in the next horizontal or vertical blanking period. This is performed by means of a synchronous separator 68 which is connected to the gate 65 and opens another gate 67. With the circuit just described, no discontinuity occurs during the switching of heads 59 and 60 in either direction.

Taking into consideration that the necessity for introducing the delay exists where the heads are switched within the same recording track, any suitable discriminating means for detecting whether the heads are on the same track or on different tracks can be employed in conjunction with the delay means to provide delay as required.

FIG. 9 shows a modification of the gating portion of the circuit of FIG. 8 in which the gates 64 and 65 are each followed by suitable delay means 69 and 70, which have delay times equal to one-half of the required value. A switching means 71 is also provided and is controlled by the detecting or triggering means referred to above. The switching means 71 is preferably an electronic switch.

FIG. 10 illustrates a further circuit arrangement in which the output signals of two heads are added together. This circuit is preferably used with FIGS. 2 and 6 in which the space between tracks is equal to the width of the head. A detector is connected to each head 59 and 60 and a delay circuit 73 similar to that employed in FIG. 8 is employed. The output of the detector 72 controls a gate 74 which shunts the delay circuit 73. The summed output will appear on lead 75 and is always the summation of output signals of the proper phase due to the automatic action of the gate 74.

The complementary multiple head system according to the present invention is also applicable to systems which produce a recording track pattern of the type shown in FIG. 11. Such a pattern is produced by means of a rotating head assembly having four heads. The track of one field is composed of sixteen tracks arranged perpendicularly to the direction of length of the tape. Therefore, adjacent tracks cannot have similar information as described above. In this case two heads 78 and 79 are placed as shown one field or frame apart and are also arranged to track in complementary fashion. The heads should preferably be arranged at the corresponding point of the next field or frame. The switching or adding of the output signals from the two heads is performed as described above. In this case the traversal of the head above adjacent tracks generates a distorted signal and therefore switching of heads is necessary. The distance of the double heads in this case is approximately 0.256″ or its multiple which is quite a practical value.

In the case of a one or two head video tape recorder, the distance between the multiple heads can be arbitrarily selected by altering the inclination angle $\theta$ shown in FIGS. 2, 4 and 6, that is, by altering the relation between the tape width and the diameter of the head drum. In order that the construction of the head drum be feasible, the distance of the multiple heads should be large enough to provide convenient mounting. This leads to a reduction of the angle $\theta$ and therefore to a larger skip of the horizontal line sequence when switching in one direction. The complementary heads may, for convenience of construction, straddle two or more tracks.

The recording medium may be of varying shapes such as for example, tape, disc, cylinder or tube. In the case of the disc or cylinder, if one relative revolution between the heads and the disc or cylinder corresponds to one frame, the adjacent tracks will then represent sequential lines of the picture. If one revolution corresponds to one field, the one revolution should correctly correspond to one field plus a half line in order that the horizontal blankings be properly aligned. Such arrangement will allow still, quick or slow motion of the picture during reproduction.

The present invention is also suitable for reproduction at different frame frequencies. This can be accomplished by a rotating head assembly having a different rotational speed from that of recording. A drum or disc may also be employed with this arrangement. However, in view of the wear of the magnetic medium, the use of magnetic tape is preferable but the disc or drum is superior from the standpoint of obtaining similarity of adjacent tracks.

In the case of the magnetic tape, deviation of the line sequence may spoil the quality of the picture if only a single reproducing head is used. In the multiple reproducing head system according to the present invention, however, deviation of the line sequence is fully compensated for by the switching arrangement described.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An arrangement for recording and reproducing periodic signals comprising
   movable signal recording means for receiving said signals to develop a magnetic field in response thereto,
   a movable recording medium for receiving magnetic impressions of said signals when said medium is scanned by said means,
   said magnetic impressions being in the form of a plurality of tracks of identical shape and spaced equidistantly from one another,
   and a pair of reproducing heads adapted to simultaneously scan said impressions to thereby develop output signals,
   said heads each having an effective width substantially equal to the width of said tracks and being positioned in complementary relationship so that when one of said heads scans one of said tracks in a position of substantially perfect alignment therewith the other of said heads scans the spacing between said tracks,
   and switching means for alternately selecting the output signals from said heads when the rate at which said reproduced signals are developed is different from the rate at which said periodic signals are recorded.

2. An arrangement for reproducing a video picture made up of a plurality of periodic signals comprising
   a recording medium having thereon a recorded pattern representative of said video picture,
   said pattern being formed of a plurality of signal tracks substantially parallel to one another and spaced equidistantly from one another, each of said tracks being made up of a plurality of consecutively formed horizontal line signal elements each corresponding to a line of said picture,
   means for moving said recording medium and means for scanning said medium as it is moving,
   said scanning means including a pair of reproducing heads adapted to simultaneously scan said pattern to thereby develop output signals,
   said heads each having an effective width substantially equal to the width of said tracks and being positioned in complementary relationship so that when one of said heads scans one of said tracks in a position of substantially perfect alignment therewith the other of said heads scans the spacing between said tracks,
   and switching means for alternately selecting the output signals from said heads upon mistracking of said heads with the tracks of said pattern as said picture is reproduced.

3. The invention described in claim 2 wherein said recording medium comprises an elongated magnetic tape, and wherein said tracks are arranged in oblique relationship to the longitudinal direction of said tape.

4. The invention described in claim 2 wherein said switching means includes means for comparing the output signals from said reproducing heads, and means for selecting the output signal having the best signal to noise ratio.

5. The invention described in claim 2 wherein said switching means comprises
   gating means connected between each of said heads and an output terminal,
   means coupled to each of said heads for rectifying the output signals therefrom,
   separate time delay means coupled to the output from each of said rectifying means,
   and a bistable circuit coupled to receive the output from each of said time relay means,
   said gating means being selectively controlled by the action of said bistable circuit to thereby connect the head developing the signal having the greatest signal to noise ratio to said output terminal.

6. The invention described in claim 2 wherein said switching means comprises
   gating means coupled between each of said heads and an output terminal,
   detector means coupled to each of said heads,
   a bistable circuit coupled between said detectors and each of said gating means,
   delay means coupled between one of said heads and the gating means associated therewith,
   a third gating means connected in bridging relationship with said delay means,
   and a synchronous separator coupled between said third gating means and the gating means associated with said delay means, whereby discontinuity during switching in the reproduction of the video picture is eliminated.

7. An arrangement for reproducing a video picture made up of a plurality of periodic signals comprising
   a recording medium having thereon a recorded pattern representative of said video picture,
   said pattern being formed of a plurality of signal tracks substantially parallel to one another and spaced equidistantly from one another, each of said tracks being made up of a plurality of consecutively formed horizontal line signal elements each corresponding to a line of said picture,
   means for moving said recording medium and means for scanning said medium at it is moving,
   said scanning means including a pair of reproducing heads adapted to simultaneously scan said pattern to thereby develop output signals,
   said heads being positioned in side-by-side relationship so that they scan the same longitudinal region of said tracks at a given instant and being further positioned close to each other so that together they have an effective width equivalent to that of a single track,
   said heads each having an effective width substantially equal to the spacing between said tracks.

8. The invention described in claim 7 which further includes a third head disposed in the path of one of said other heads and displaced therefrom in the direction of said tracks by an amount equal to the length of one of said horizontal line signal elements, said third head also having an effective width substantially equal to the spacing between said tracks.

9. An arrangement for recording and reproducing periodic signals comprising
   movable signal recording means for receiving said signals to develop a magnetic field in response thereto,
   a movable recording medium for receiving magnetic impressions of said signals when said medium is scanned by said means,
   said magnetic impressions being in the form of a plurality of tracks of identical shape spaced equidistantly from one another,
   said tracks having a width substantially equal to the spacing between adjacent tracks,
   and a pair of reproducing heads adapted to simultaneously scan said impressions to thereby develop output signals,
   said heads each having an effective width substantially equal to the width of said tracks and being positioned in complementary relationship so that when one of said heads scans one of said tracks in a position of substantially perfect alignment therewith the other of said heads scans the spacing between said tracks, and means for adding the output signals developed by said heads as said impressions are scanned to thereby produce an output signal having an amplitude which is substantially unaffected by misalignment of said heads with respect to said tracks.

10. An arrangement for reproducing a video picture made up of a plurality of periodic signals comprising a recording medium having thereon a recorded pattern representative of said video picture, said pattern being formed of a plurality of signal tracks substantially parallel to one another and spaced from one another, said tracks each having a width substantially equal to the spacing between said tracks, each of said tracks being made up of a plurality of consecutively formed horizontal line signal elements each corresponding to a line of said picture, means for moving said recording medium and means for scanning said medium as it is moving, said scanning means including a pair of reproducing heads adapted to simultaneously scan said pattern to thereby develop output signals, said heads each being an effective width substantially equal to the width of said tracks and being positioned in complementary relationship so that when one of said heads scans one of said tracks in a position of substantially perfect alignment therewith the other of said heads scans the spacing between said tracks, and means for adding the output signals developed by said heads as said pattern is scanned to thereby produce an output signal having an amplitude which is substantially unaffected by misalignment of said heads with respect to said tracks.

11. The invention described in claim 10 wherein said recording medium comprises an elongated tape, and wherein said tracks are arranged in oblique relationship to the longitudinal direction of said tape.

12. The invention described in claim 10 wherein each track of said pattern contains information corresponding to one field of said video picture, and wherein adjacent tracks are displaced from each other in the direction of said tracks by an amount equal to an odd multiple of one half the length of said horizontal line signal elements.

13. The invention described in claim 11 wherein said tape is moved along the surface of an arcuate shaped member, and wherein said scanning means includes a rotatable member upon which said heads are mounted, whereby said heads scan said pattern in a complementary manner as said tape is moved along said arcuate member.

No references cited.